(12) United States Patent
Pawloski et al.

(10) Patent No.: US 10,518,444 B2
(45) Date of Patent: Dec. 31, 2019

(54) COMPOSTABLE OR BIOBASED FOAMS

(71) Applicant: Lifoam Industries, LLC, Hunt Valley, MD (US)

(72) Inventors: Adam R. Pawloski, Lake Elmo, MN (US); Jeffrey J. Cernohous, Hudson, WI (US); Kent Kaske, Woodbury, MN (US)

(73) Assignee: Lifoam Industries, LLC, Greer, SC (US)

( * ) Notice: Subject to any disclaimer, the term of this patent is extended or adjusted under 35 U.S.C. 154(b) by 331 days.

(21) Appl. No.: 15/382,999

(22) Filed: Dec. 19, 2016

(65) Prior Publication Data

US 2017/0100861 A1     Apr. 13, 2017

Related U.S. Application Data

(62) Division of application No. 13/178,293, filed on Jul. 7, 2011, now abandoned.

(60) Provisional application No. 61/362,009, filed on Jul. 7, 2010.

(51) Int. Cl.
| | |
|---|---|
| *B29C 44/34* | (2006.01) |
| *C08J 9/16* | (2006.01) |
| *B29B 9/06* | (2006.01) |
| *C08J 9/12* | (2006.01) |
| *B29K 67/00* | (2006.01) |
| *B29K 105/00* | (2006.01) |

(52) U.S. Cl.
CPC ............ *B29C 44/3461* (2013.01); *B29B 9/06* (2013.01); *B29C 44/348* (2013.01); *C08J 9/122* (2013.01); *C08J 9/16* (2013.01); *B29K 2067/04* (2013.01); *B29K 2105/0005* (2013.01); *B29K 2105/0032* (2013.01); *B29K 2105/0038* (2013.01); *B29K 2105/0044* (2013.01); *B29K 2995/006* (2013.01); *C08J 2201/03* (2013.01); *C08J 2203/06* (2013.01); *C08J 2203/08* (2013.01); *C08J 2300/16* (2013.01); *C08J 2367/02* (2013.01); *C08J 2367/04* (2013.01); *Y10T 428/2982* (2015.01)

(58) Field of Classification Search
CPC ..... B29C 44/3461; B29C 44/348; B29B 9/06; C08J 9/122; C08J 9/16; C08J 2367/04; C08J 2203/08; C08J 2203/06; C08J 2201/03; C08J 2300/16; C08J 2367/02; B29K 2067/04; B29K 2105/0005; B29K 2105/0032; B29K 2105/0038; B29K 2995/006; B29K 2105/0044; Y10T 428/2982

See application file for complete search history.

(56) References Cited

U.S. PATENT DOCUMENTS

| | | |
|---|---|---|
| 2,950,261 A | 8/1960 | Buchholz et al. |
| 3,709,806 A | 1/1973 | Minami et al. |
| 3,949,145 A | 4/1976 | Otey et al. |
| 4,473,665 A | 9/1984 | Martin-Vvedensky et al. |
| 4,702,868 A | 10/1987 | Pontiff |
| 4,758,432 A | 7/1988 | Yeung et al. |
| 5,026,736 A | 6/1991 | Pontiff |
| 5,134,171 A | 7/1992 | Hammel et al. |
| 5,158,986 A | 10/1992 | Cha et al. |
| 5,198,163 A | 3/1993 | Yamamoto et al. |
| 5,223,546 A | 6/1993 | Morita et al. |
| 5,314,754 A | 5/1994 | Knight |
| 5,316,578 A | 5/1994 | Buehler et al. |
| 5,322,866 A | 6/1994 | Mayer et al. |
| 5,362,777 A | 11/1994 | Tomka |
| 5,374,304 A | 12/1994 | Frische et al. |
| 5,437,924 A | 8/1995 | Decker, III et al. |
| 5,444,113 A | 8/1995 | Sinclair et al. |

(Continued)

FOREIGN PATENT DOCUMENTS

| | | |
|---|---|---|
| CA | 2202869 | 5/1996 |
| EP | 1 378 538 A1 | 1/2004 |

(Continued)

OTHER PUBLICATIONS

Henton, David. E., et al., "Chapter 16 Polyactic Acid Technology, Natural Fibers, Biopolymers, and Biocomposites", 2005, pp. 527-577, CRC Press.
Enhancing Biopolymers: Additives Are Needed for Toughness, Heat Resistance & Processability (2008).
SYNBRA, press release for BioFoam, undated.
Sekisui Plastics Co., Ltd., press release entitled "Success in developing the foamed plastic by beads method-employed plant-derived resin, with a dimensional stability under 150 C", Oct. 23, 2007.

(Continued)

*Primary Examiner* — Nathan L Van Sell
(74) *Attorney, Agent, or Firm* — Eversheds Sutherland (US) LLP

(57) ABSTRACT

The present invention describes compostable or biobased foams that are useful for fabricating foamed articles and methods for producing the same. The foams are produced using a compound comprising a compostable or biobased polyester and a blowing agent. Additives including plasticizers and chain extenders are optionally included in the compostable or biobased composition. These foams can be produced using conventional melt processing techniques, such as single and twin-screw extrusion processes. In one embodiment, foamed strand profiles are cooled and cut using conventional strand pelletizing equipment. In another embodiment, foamed beads are produced by cutting the foamed strand at the face of the extrusion die and the foamed bead or strand is subsequently cooled. The resulting compostable or biobased foamed bead has a specific gravity less than 0.15 g/cm$^3$ and the foam is compostable, as determined by ASTM D6400.

19 Claims, 3 Drawing Sheets

(56) References Cited

U.S. PATENT DOCUMENTS

| | | |
|---|---|---|
| 5,449,708 A | 9/1995 | Schiltz |
| 5,496,895 A | 3/1996 | Chinnaswamy et al. |
| 5,569,692 A | 10/1996 | Bastioli et al. |
| 5,589,518 A | 12/1996 | Bastioli |
| 5,605,937 A | 2/1997 | Knaus |
| 5,760,118 A | 6/1998 | Sinclair et al. |
| 5,766,749 A | 6/1998 | Kakinoki |
| 5,854,345 A | 12/1998 | Xu et al. |
| 5,866,053 A | 2/1999 | Park et al. |
| 6,184,261 B1 | 2/2001 | Biby et al. |
| 6,214,907 B1 | 4/2001 | Tomka |
| 6,221,926 B1 | 4/2001 | Oohara et al. |
| 6,235,380 B1 | 5/2001 | Tupil et al. |
| 6,271,272 B1 | 8/2001 | Carlier et al. |
| 6,306,921 B1 | 10/2001 | Ghatta et al. |
| 6,323,307 B1 * | 11/2001 | Bigg .............. C08K 3/012 528/354 |
| 6,376,059 B1 | 4/2002 | Anderson et al. |
| 6,458,858 B1 | 10/2002 | Braun et al. |
| 6,573,308 B1 | 6/2003 | Braun |
| 6,593,384 B2 | 7/2003 | Anderson et al. |
| 6,645,479 B1 | 11/2003 | Shefer et al. |
| 6,723,264 B1 | 4/2004 | Bussey, Jr. et al. |
| 6,740,731 B2 | 5/2004 | Bigg et al. |
| 6,787,580 B2 | 9/2004 | Chonde et al. |
| 6,833,403 B1 | 12/2004 | Bladel et al. |
| 6,903,053 B2 | 6/2005 | Noda et al. |
| 7,226,615 B2 | 6/2007 | Yuksel et al. |
| 7,297,394 B2 | 11/2007 | Khemani et al. |
| 7,358,296 B2 | 4/2008 | Bladel et al. |
| 7,495,044 B2 | 2/2009 | Long et al. |
| 7,524,891 B2 | 4/2009 | Rose et al. |
| 7,615,183 B2 | 11/2009 | Tweed et al. |
| 7,671,112 B2 | 3/2010 | Hintzer et al. |
| 7,863,343 B2 | 1/2011 | Haraguchi |
| 2003/0236329 A1 | 12/2003 | Kawamoto et al. |
| 2005/0094482 A1 | 5/2005 | Foster et al. |
| 2006/0091576 A1 | 5/2006 | Takase et al. |
| 2006/0167122 A1 | 7/2006 | Haraguchi et al. |
| 2006/0223723 A1 | 10/2006 | Provan |
| 2006/0292323 A1 * | 12/2006 | Hutchinson .............. B05D 7/02 428/36.91 |
| 2007/0254060 A1 | 11/2007 | Errington et al. |
| 2007/0293593 A1 | 12/2007 | Hartmann |
| 2008/0033077 A1 | 2/2008 | Hashimoto et al. |
| 2008/0146686 A1 | 6/2008 | Handa |
| 2008/0262118 A1 | 10/2008 | Cink |
| 2009/0234035 A1 | 9/2009 | Cheung et al. |
| 2009/0239963 A1 * | 9/2009 | Lu .................. C08J 9/0061 521/95 |
| 2009/0258175 A1 | 10/2009 | Matsuoka et al. |
| 2009/0306287 A1 | 12/2009 | Chung et al. |
| 2010/0028654 A1 | 2/2010 | Takase |
| 2010/0029793 A1 | 2/2010 | Witt et al. |
| 2010/0056656 A1 | 3/2010 | Matsuoka |
| 2010/0098928 A1 | 4/2010 | Britton et al. |
| 2010/0120932 A1 | 5/2010 | Yoshioka et al. |
| 2010/0136338 A1 | 6/2010 | Harai et al. |
| 2011/0263732 A1 | 10/2011 | Ramesh et al. |
| 2012/0007267 A1 | 1/2012 | Pawloski et al. |
| 2012/0009420 A1 | 1/2012 | Pawloski |
| 2012/0010307 A1 | 1/2012 | Pawloski |
| 2012/0065286 A1 | 3/2012 | Pawloski |

FOREIGN PATENT DOCUMENTS

| | | |
|---|---|---|
| EP | 2168993 | 3/2010 |
| JP | 05009323 A | 1/1993 |
| JP | 08-198992 | 8/1996 |
| JP | 2000-017038 | 1/2000 |
| JP | 2002-179832 | 6/2002 |
| JP | 2002-302567 | 10/2002 |
| JP | 2003-073495 | 3/2003 |
| JP | 2003-301067 | 10/2003 |
| JP | 2004180936 | 7/2004 |
| JP | 2004-277440 | 10/2004 |
| JP | 2004-307662 | 11/2004 |
| JP | 2005-264166 | 9/2005 |
| JP | 2006-002137 | 1/2006 |
| JP | 2007-100026 | 4/2007 |
| JP | 2007-126539 | 5/2007 |
| JP | 2007-169394 | 7/2007 |
| JP | 2007-186692 A | 7/2007 |
| JP | 2008-214423 | 9/2008 |
| JP | 2009-062503 | 3/2009 |
| WO | 9808667 | 3/1998 |
| WO | 98/31521 | 7/1998 |
| WO | 99/32544 | 7/1999 |
| WO | 2007052543 | 5/2007 |
| WO | 2008/093284 | 8/2008 |
| WO | 2008/123367 | 10/2008 |
| WO | 2008/130226 A2 | 10/2008 |
| WO | 2011/038081 | 3/2011 |

OTHER PUBLICATIONS

Noordegraaf, "Cradle to Cradle Certified PLA Foam", Bioplastics Magazine, vol. 5, Jan. 2010, pp. 24-25.

European Search Report for Application No. 12 807 830.0, dated Feb. 17, 2016, 5 pages.

* cited by examiner

COMPOSTABLE OR BIOBASED FOAMS

CROSS REFERENCE TO RELATED APPLICATION

This application is a division of U.S. application Ser. No. 13/178,293 filed on Jul. 7, 2011; said application is based upon and claims benefit of co-owned U.S. Provisional Patent Application Ser. No. 61/362,009 entitled "Biodegradable Foams", filed with the U.S. Patent and Trademark Office on Jul. 7, 2010 by the inventors herein, the specification of which is incorporated herein by reference.

BACKGROUND

Field of the Invention

This invention relates generally to compostable or biobased material compositions and to novel methods for producing lightweight, compostable or biobased foams and, in particular, to methods for producing foams using melt processing techniques to blend compostable or biobased materials and blowing agents that do not contain any volatile organic components (VOCs) such as pentane. The compositions and processes are useful for the production of a variety of products.

Description of the Background

Polymeric foams include a plurality of voids, also called cells, in a polymer matrix. By replacing solid plastic with voids, polymeric foams use fewer raw materials than solid plastics for a given volume. Thus, by using polymeric foams instead of solid plastics, material costs can be reduced in many applications. Additionally, foams are very good insulators that can seal building structures from air and moisture intrusion, save on utility bills, and add strength to the building.

Microcellular foams have smaller cell sizes and higher cell densities than conventional polymeric foams. Foam processes, in some cases, incorporate nucleating agents, some of which are inorganic solid particles, into the polymer melt during processing. These agents can be of a variety of compositions, such as talc and calcium carbonate, and are incorporated into the polymer melt typically to promote cell nucleation. The dispersion of nucleating agents within the polymer mixture is often times critical in forming a uniform cell structure.

The material used for expandable polystyrene (EPS) is typically an amorphous polymer that exhibits a glass transition temperature of about 95° C. and a melting temperature of about 240° C. The process of converting EPS resins into expanded polystyrene foam articles requires three main stages: pre-expansion, maturation, and molding. Expandable beads produced from polystyrene and a blowing agent are made, and then expanded by steam in a pre-expander. The purpose of pre-expansion is to produce foam particles of the desired density for a specific application. During pre-expansion, the EPS beads are fed to a pre-expander vessel containing an agitator and controlled steam and air supplies. The introduction of steam into the pre-expander yields two effects: the EPS beads soften and the blowing agent that is dispersed within the EPS beads heats to a temperature above its boiling point. These two conditions cause the EPS beads to expand in volume. The diameter of the particles increases while the density of the resin decreases. The density of pre-expanded granules is about 1000 kg/m3, and that of expanded beads lies in the range of 20 to 200 kg/m3; depending on the process, a 5 to 50 times reduction in density may be achieved.

Maturation serves several purposes. It allows the vacuum that was created within the cells of the foam particles during pre-expansion to reach equilibrium with the surrounding atmospheric pressure. It permits residual moisture on the surface of the foam particles to evaporate. And, it provides for the dissipation of excess residual blowing agent. Maturation time depends on numerous factors, including blowing agent content of the original resin, pre-expanded density, and environmental factors. Pre-expanded beads that are not properly matured are sensitive to physical and thermal shock. Molding of such beads before maturation may cause the cells within the particles to rupture, thereby producing an undesirable molded foam part.

Once the pre-expanded beads have matured, they are transferred to a molding machine containing one or more cavities that are shaped like the desired molded foam article(s). The purpose of molding is to fuse the foam particles together into a single foam part. Molding of EPS may follow a simple sequence: first, fill the mold cavity with pre-expanded beads; heat the mold by introducing steam; cool the molded foam article within the mold cavity; and eject the finished part from the mold cavity. The steam that is introduced to the molding machine causes the beads to soften and expand even further. The combination of these two effects in an enclosed cavity allows the individual particles to fuse together into a single solid foam part.

There is an increasing demand for many plastic products used in packaging to be biodegradable, for example trays in cookie and candy packages. Starch films have been proposed as biodegradable alternatives for some time. U.S. Pat. No. 3,949,145 describes a starch/polyvinyl alcohol/glycerol composition for use as a biodegradable agricultural mulch sheet.

A common approach to creating biodegradable products is to combine polylactic acid (PLA) with starch to create a hydrolytically degradable composition. Difficulties have been encountered in producing starch based polymers particularly by hot melt extrusion. The molecular structure of the starch is adversely affected by the shear stresses and temperature conditions needed to plasticize the starch and pass it through an extrusion die. Blowing agents typically are introduced into polymeric material to make polymer foams in one of two ways. According to one technique, a chemical blowing agent is mixed with a polymer. The chemical blowing agent undergoes a chemical reaction in the polymeric material, typically under conditions in which the polymer is molten, causing formation of a gas. Chemical blowing agents generally are low molecular weight organic compounds that decompose at a particular temperature and release a gas such as nitrogen, carbon dioxide, or carbon monoxide. According to another technique a physical blowing agent, i.e., a fluid that is a gas under ambient conditions, is injected into a molten polymeric stream to form a mixture. The mixture is subjected to a pressure drop, causing the blowing agent to expand and form bubbles (cells) in the polymer. Several patents and patent publications describe aspects of microcellular materials and microcellular processes.

U.S. Pat. No. 6,593,384 to Anderson et al. describes expandable particles produced using broad polymer materials and a physical blowing agent. U.S. Pat. No. 7,226,615 to Yuksel et al. describes an expandable foam based on broad disclosure of biomaterials combined with a bicarbonate blowing agent. U.S. Published Patent Application No. 2006/0167122 by Haraguchi et al. describes expandable particles derived from the combination of PLA, a blowing agent, and a polyolefin wax. U.S. Published Patent Application No.

2010/0029793 by Witt et al. describes a method of producing PLA foam by impregnating resin beads with carbon dioxide ($CO_2$).

U.S. Pat. No. 4,473,665 to Martini-Vvedensky et al. describes a process for making a foamed polymer having cells less than about 100 microns in diameter. In the described technique, a material precursor is saturated with a blowing agent, the material is placed under high pressure, and the pressure is rapidly dropped to nucleate the blowing agent and to allow the formation of cells. The material then is frozen rapidly to maintain a desired distribution of microcells.

U.S. Pat. No. 5,158,986 to Cha et al. describes formation of microcellular polymeric material using a supercritical fluid as a blowing agent. Using a batch process, the patent describes various processes to create nucleation sites.

U.S. Pat. No. 5,866,053 to Park et al. describes a continuous process for forming microcellular foam. The pressure on a single-phase solution of blowing agent and polymer is rapidly dropped to nucleate the material. The nucleation rate is high enough to form a microcellular structure in the final product.

International patent publication no. WO 98/08667 by Burnham et al. provides methods and systems for producing microcellular material, and microcellular articles. In one method, a fluid, single-phase solution of a precursor of foamed polymeric material and a blowing agent is continuously nucleated by dividing the stream into separate portions and separately nucleating each of the separate portions, then recombining the streams. The recombined stream may be shaped into a desired form, for example by a shaping die.

It is generally accepted in the field that to create enough nucleation sites to form microcellular foams, one must use a combination of sufficient blowing agent to create a driving force for nucleation, and a high enough pressure drop rate to prevent cell growth from dominating the nucleation event. As blowing agent levels are lowered, the driving force for nucleation decreases. Yet, while higher blowing agent levels can lead to smaller cells (a generally desirable result in the field of microcellular foams), according to conventional thought, higher blowing agent levels also can cause cell interconnection (which by definition increases cell size and can compromise structural and other material properties) and less-than-optimal surface properties (compromised surface properties at higher gas levels can result from the natural tendency of the blowing agent to diffuse out of the material).

In other words, it is generally accepted that there is a trade off between small cell size and optimal material properties as blowing agent levels in microcellular polymeric material are altered.

SUMMARY

Accordingly, it is an object of the present invention to provide a compostable or biobased foam that avoids the disadvantages of the prior art.

It is another object of the present invention to provide a method for producing compostable or biobased foams using melt processing techniques. A related object of the present invention is to provide a method for producing compostable or biobased foams using blowing agents that do not contain volatile organic components. A further related object of the present invention is to provide a method for producing compostable or biobased foams using blowing agents that do not contain pentane.

It is another object of the present invention to provide a compostable or biobased, foamed bead that can be processed using conventional molding equipment.

Another object of the present invention is to provide a foamed bead that is capable of chemically degrading into lower molecular weight materials by the process of composting. A further object of the invention is to provide a compostable or biobased, foamed bead that can be fabricated into a three-dimensional shape.

These and other objects of the present invention are accomplished by providing a composition and process for producing foamed beads from a compostable or biobased polymer and for using such beads in producing a variety of items. In one embodiment, lightweight beads are produced by melt processing a compostable or biobased polymer and a blowing agent. In another embodiment, the melt processable composition includes additional additives that improve the rheological characteristics of the compostable or biobased polymer, making it more amenable for producing lightweight, foamed beads. The foamed beads of this invention can be further processed using conventional molding equipment to provide a lightweight, compostable or biobased, foamed article. Articles of this invention have utility in applications where conventional expandable polystyrene (EPS) is utilized today, including those applications relating to protective packaging, sound dampening, and thermal insulation.

Polymer compositions are widely utilized in numerous applications, including automotive, home construction, electronic and consumer good products. The polymers may be composed of either biobased polymers or petroleum-based polymers. Compostable or biobased polymers are preferred to address environmental concerns associated with disposal of the materials once they are no longer useful for their intended purpose and minimizing the use of petroleum. However, the polymers must meet certain physical and chemical characteristics in order for them to be suitable for the intended application. In expandable foams, the polymer composition must be able to be fabricated into a three dimensional shape that is lightweight and provides impact, sound, and thermal resistance or protection. The invention described herein discloses compostable or biobased foams having attributes that are required to form products that possess these attributes.

For purposes of the present invention, the following terms used in this application are defined as follows:

"Biodegradable Polymer" means a polymeric material or resin that is capable of chemically degrading into lower molecular weight materials.

"Nucleating agent" means a material that is added to a polymer melt that provide sites for crystal formation. For example, a higher degree of crystallinity and more uniform crystalline structure may be obtained by adding a nucleating agent.

"Chain Extender" means a material that when melt processed with a polymer, increases the molecular weight by reactively coupling chain ends.

"Melt Processable Composition" means a formulation that is melt processed, typically at elevated temperatures, by means of a conventional polymer processing technique such as extrusion or injection molding as an example.

"Melt Processing Techniques" means extrusion, injection molding, blow molding, rotomolding, or batch mixing.

"Extrudate" is the semisolid material that has been extruded and shaped into a continuous form by forcing the material through a die opening.

BRIEF DESCRIPTION OF THE DRAWINGS

The above and other features, aspects, and advantages of the present invention are considered in more detail in relation to the following description of embodiments thereof shown in the accompanying drawings, in which.

DETAILED DESCRIPTION OF EXEMPLARY EMBODIMENTS

Figure 1:
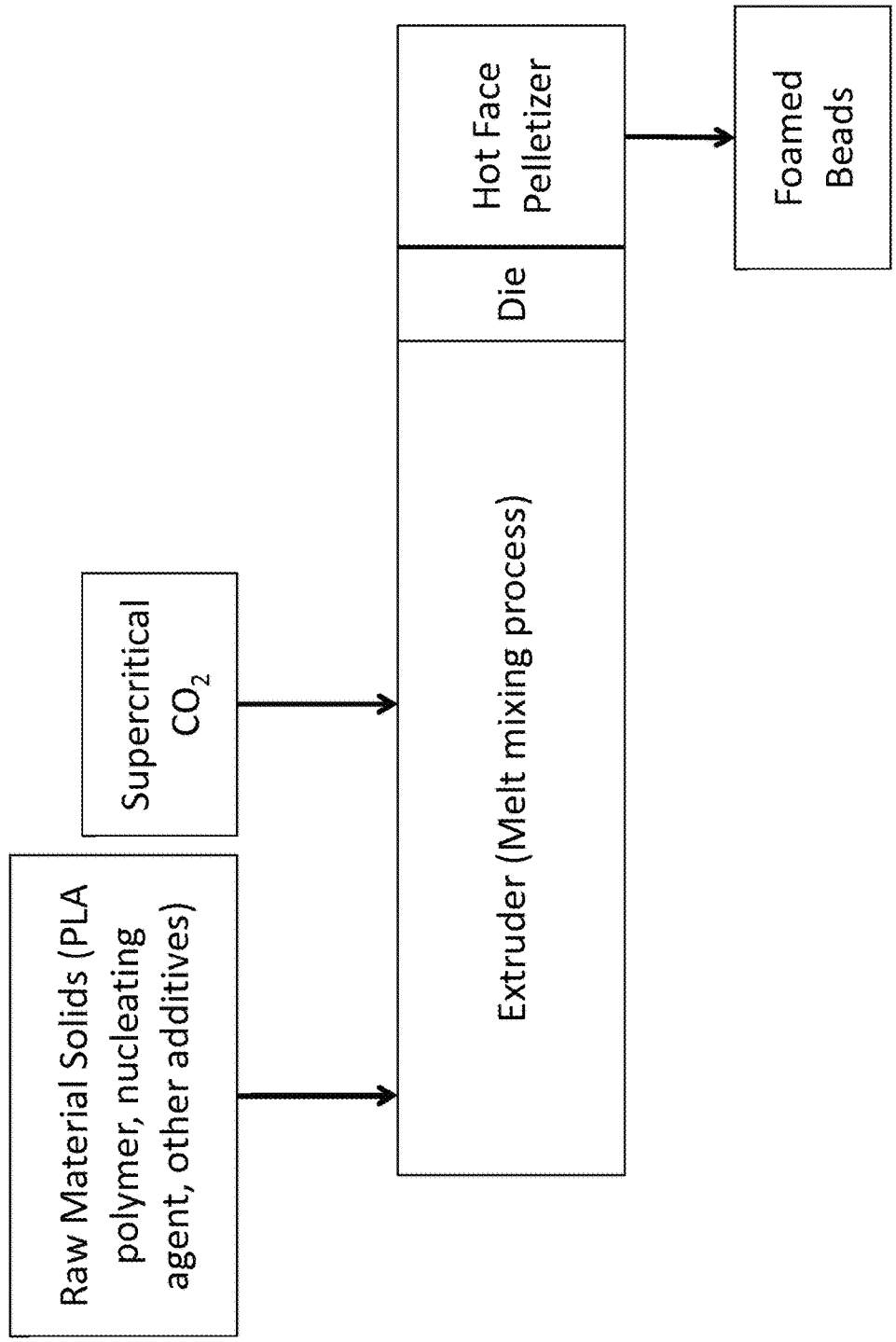
FIG. 1 shows a general process schematic for foamed bead production by extrusion foaming process according to the present invention.

The invention summarized above and defined by the enumerated claims may be better understood by referring to the following description. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The present invention is directed toward a variety of products that are made of compostable or biobased materials. The compostable or biobased materials can include either or both of an externally or an internally modified polymer composition, as those terms are described below.

Degradability

Biodegradability refers to a compound that is subject to enzymatic decomposition, such as by microorganisms, or a compound, portions of which are subject to enzymatic decomposition, such as by microorganisms. In one instance, for example, a polymer such as polylactic acid can be degraded by hydrolysis to individual lactic acid molecules that are subject to enzymatic decomposition by a wide variety of microorganisms. Microorganisms typically can consume carboxylic acid-containing oligomers with molecular weights of up to about 1000 daltons, and preferably up to about 600 daltons, depending on the chemical and physical characteristics of the oligomer.

Biobased means materials that are synthesized from biological sources and refers to ingredients that reduce the use of non-renewable resources by integrating renewable ingredients as a replacement for at least a portion of the materials in a product. For example, replacement of petroleum used in making EPS. Biobased ingredients can be used in many products without hindering their performance.

Composting is the biological process of breaking down organic waste into a useful substance by various microorganisms in the presence of oxygen.

Preferably, the polymer in the present materials breaks down by composting. The degradation characteristics of the polymer in the present materials depend in large part on the type of material being made with the polymer. Thus, the polymer needs to have suitable degradation characteristics so that when processed and produced into a final material, the material does not undergo significant degradation until after the useful life of the material.

The polymer of the present materials is further characterized as being compostable within a time frame in which products made from the materials break down after use. The materials of this invention degrade in a time period of a few weeks to a few years, whereas similar mass-produced, nondegradable products typically require decades to centuries to break down naturally.

The present invention describes compostable or biobased foam beads that are useful for fabricating foamed articles. The foams of this invention are produced using a compound comprising a compostable or biobased thermoplastic polymer and a blowing agent. Such compostable thermoplastic polymer material may be used to replace expandable polystyrene (EPS) with a foamed bead produced from the compostable or biobased polymer resin in the construction of foamed articles. Ideally, one would substitute polystyrene with a compostable or biobased polymer of the same chemical and physical properties.

Additives including plasticizers and chain extenders are optionally included in the compostable or biobased composition. Preferably, the polymer is greater than 50% biobased content, most preferably greater than 80% biobased. These foams can be produced using conventional melt processing techniques, such as single and twin-screw extrusion processes. In one embodiment, foamed beads are produced by cutting extrudate at the face of the extrusion die. The foamed bead is subsequently optionally cooled by contacting with water, water vapor, air, carbon dioxide, or nitrogen gas. After the bead is cut at the face of the die, the bead continues to foam, thus forming a closed cell foam structure with a continuous surface skin, i.e. there is no open cell structure at the surface of the bead. In one embodiment, the resulting compostable or biobased, foamed bead has a specific gravity less than 0.15 g/cm3. In another embodiment, the compostable or biobased, foamed bead has a specific gravity of preferably less than 0.075 g/cm3, and most preferably less than 0.05 g/cm3. In another embodiment, more than 50 wt % of the foam is produced from compostable materials, as determined by ASTM D6400. In a preferred embodiment, more than 80% of the foam is produced from compostable materials. In a most preferred embodiment, greater than 95% of the foam is produced from compostable materials.

The compostable or biobased polymers of this invention are produced by melt processing compostable or biobased polymers with a blowing agent and, optionally, additives that modify the rheology of the compostable or biobased polymer, including chain extenders and plasticizers. The compostable or biobased polymers may include those polymers generally recognized by one of ordinary skill in the art to decompose into compounds having lower molecular weights. Non-limiting examples of compostable or biobased polymers suitable for practicing the present invention include polysaccharides, peptides, polyesters, polyamino acids, polyvinyl alcohol, polyamides, polyalkylene glycols, and copolymers thereof.

In one aspect, the compostable or biobased polymer is a polyester. Non-limiting examples of polyesters include polylactic acids, poly-L-lactic acid (PLLA), poly-D-lactic acid (PDLA) and random or stereoregular copolymers of L-lactic acid and D-lactic acid, and derivatives thereof. Other non-limiting examples of polyesters include polycaprolactone, polyhydroxybutyric acid, polyhydroxyvaleric acid, polyethylene succinate, polybutylene succinate, polybutylene adipate, polymalic acid, polyglycolic acid, polysuccinate, polyoxalate, polybutylene diglycolate, and polydioxanone.

Preferred polymer resins for this invention include known compostable materials derived from biological sources (e.g. compostable biopolymer resins), but synthetic polymers capable of being composted are also acceptable. The biopolymer polylactic acid (PLA) is the most preferred example due to its known compostability and its biobased origins from agricultural (e.g. corn) feedstocks. Both amorphous and semi-crystalline PLA polymers can be used. Examples of compostable or biobased polymers include Ingeo 2002D and Ingeo 4060D grade plastics and Ingeo 805 ID grade foam from NatureWorks, LLC, and Cereplast Compostable 5001.

Blowing agents are materials that can be incorporated into the melt processable composition (e.g., the premix of the additives, polymeric matrix, and/or optional fillers, either in melt or solid form) to produce cells through the release of a gas at the appropriate time during processing. The amount and types of blowing agents influence the density of the finished product by its cell structure. Any suitable blowing agent may be used to produce the foamed material.

There are two major types of blowing agents: physical and chemical. Physical blowing agents tend to be volatile liquids or compressed gases that change state during melt processing to form a cellular structure. In a preferred embodiment, the physical blowing agent is carbon dioxide. In the most preferred embodiment, the physical blowing agent of carbon dioxide in its supercritical state is mixed with the polymer melt. Chemical blowing agents tend to be solids that decompose (e.g., thermally, reaction with other products, and so forth) to form gaseous decomposition products. The gases produced are finely distributed in the melt processable composition to provide a cellular structure.

Blowing agents can be divided into two major classifications: organic and inorganic. Organic blowing agents are available in a wide range of different chemistries, physical forms and modification, such as, for example, azodicarbonamide. Inorganic blowing agents tend to be more limited. An inorganic blowing agent may include one or more carbonate salts such as Sodium, Calcium, Potassium, and/or Magnesium carbonate salts. Preferably, sodium bicarbonate is used because it is inexpensive and readily decomposes to form carbon dioxide gas. Sodium bicarbonate gradually decomposes when heated above about 120° C., with significant decomposition occurring between approximately 150° C. and 200° C. In general, the higher the temperature, the more quickly the sodium bicarbonate decomposes. An acid, such as citric acid, may also be included in the foaming additive, or added separately to the melt processable composition, to facilitate decomposition of the blowing agent. Chemical blowing agents are usually supplied in powder form or pellet form. The specific choice of the blowing agent will be related to the cost, desired cell development and gas yield and the desired properties of the foamed material.

Suitable examples of blowing agents include water, carbonate salts and other carbon dioxide releasing materials, diazo compounds and other nitrogen producing materials, carbon dioxide, decomposing polymeric materials such as poly (t-butylmethacrylate) and polyacrylic acid, alkane and cycloalkane gases such as pentane and butane, inert gases such as nitrogen, and the like. The blowing agent may be hydrophilic or hydrophobic. In one embodiment, the blowing agent may be a solid blowing agent. In another embodiment, the blowing agent may include one or more carbonate salts such as sodium, potassium, calcium, and/or magnesium carbonate salts. In yet another embodiment, the blowing agent may be inorganic. The blowing agent may also include sodium carbonate and sodium bicarbonate, or, alternatively, sodium bicarbonate alone.

Although the blowing agent composition may include only the blowing agent, a more typical situation is where the blowing agent includes a polymeric carrier that is used to carry or hold the blowing agent. This blowing agent concentrate may be dispersed in the polymeric carrier for transport and/or handling purposes. The polymeric carrier may also be used to hold or carry any of the other materials or additives that are desired to be added to the melt processable composition.

The inclusion levels of the blowing agent in the concentrate may vary widely. In some embodiments, the foaming additive includes at least about 2.5 wt % of blowing agent, at least about 5 wt % of blowing agent, or, suitably, at least about 10 wt % of blowing agent. In other embodiments, the foaming additive may include about 10 to 60 wt % of blowing agent, about 15 to 50 wt % of blowing agent, or, suitably, about 20 to 45 wt % of blowing agent. In yet further embodiments, the foaming additive may include about 0.05 to 90 wt % of blowing agent, about 0.1 to 50 wt % of blowing agent, or about 1 to 26 wt % of blowing agent.

As mentioned previously, the blowing agent concentrate may also include a polymeric carrier or material that is used to hold the other additives to form a single additive. The polymeric carrier or polymeric component may be any suitable polymeric material such as hydrocarbon or non-hydrocarbon polymers. The polymeric carrier should be capable of being melted or melt processed at temperatures below the activation temperature of the blowing agent. In some instances, however, a polymeric component having a melting point above the activation temperature of the blowing agent may be used as long as it is processed quickly enough so that a suitable amount of active blowing agent remains. In one embodiment, the polymeric carrier has a melting point of no more than about 150° C., no more than about 125° C., no more than about 100° C., or, suitably, no more than about 80° C. In a preferred embodiment, the blowing agent concentrate contains a compostable or biobased polymer.

In another embodiment, a plasticizer may be added or incorporated into the composition to address desired physical characteristics of the melt processable composition. Non-limiting examples of plasticizers include polyaklylene glycols and functionalized naturally occurring oils. Non-limiting examples of polyalkylene glycols include polyethylene glycols sold under the Carbowax trade name (Dow Chemical Co., Midland, Mich.). Non-limiting examples of functionalized naturally occurring oils include malinated or epoxidized soybean, linseed, or sunflower oils, which are commercially available from Cargill Inc.

In another embodiment, the compostable or biobased composition may include a chain extender to increase the molecular weight of the compostable or biobased polymer during melt processing. This also has the effect of increasing melt viscosity and strength, which can improve the foamability of the compostable or biobased polymer. An example of chain extenders useful in this invention include those marketed under the CESA-extend trade name from Clariant, and those marketed under the Johncryl trade name from BASF.

In the composition of the present invention, moldability can be improved by adding a nucleating agent. The dispersion of a nucleating agent within the polymer mixture helps in forming a uniform cell structure. Examples of nucleating agents include inorganic powder such as talc, kaolin, mica, silica, calcium carbonate, barium sulfate, titanium oxide, aluminum oxide, clay, bentonite, and diatomaceous earth, and known chemical blowing agents such as azodicarbodiamide. Among them, talc is preferred because it facilitates control of the cell diameter. The content of the nucleating agent varies depending on the type of the nucleating agent and the intended cell diameter.

In another aspect of the invention, the compostable or biobased, melt processable composition may contain other additives. Non-limiting examples of additives include antioxidants, light stabilizers, fibers, blowing agents, foaming additives, antiblocking agents, heat stabilizers, impact modifiers, biocides, compatibilizers, tackifiers, colorants, coupling agents, antistatic agents, electrically conductive fillers, and pigments. The additives may be incorporated into the melt processable composition in the form of powders, pellets, granules, or in any other extrudable form. The amount and type of additives in the melt processable composition may vary depending upon the polymeric matrix and the desired physical properties of the finished composition. Those skilled in the art of melt processing are capable of selecting appropriate amounts and types of additives to match with a specific polymeric matrix in order to achieve desired physical properties of the finished material.

The amount of components in the melt processable, compostable or biobased foam composition may vary depending upon the intended end use application. The compostable or biobased polymer may comprise from about 40 to about 99 percent by weight of the final composition. The blowing agent may be included at a level of up to 20 percent by weight. The compostable or biobased plasticizer may comprise from about 1 to 50 percent by weight of the final composition. The chain extender may comprise about 0.1 to 10 percent by weight of the final composition. Nucleating agents (such as talc) can be included up to about 5% by weight, more preferably less than 1% by weight, most preferably 0.5% by weight.

The physical blowing agent, such as supercritical $CO_2$, is combined with the melt early in the extruder mixing process. Then, as the mixture exits the extruder and is cut, the supercritical $CO_2$ expands to form the foamed beads. Optionally, heating of the beads during a secondary expansion process allows for expansion of the material to lower density.

In some embodiments, the foamed beads may optionally be pressurized with a gas that will allow for additional expansion of the bead in the molding operation for the desired end product. The optional pressurization is used to make the internal pressure of the cells within the foam greater than the atmospheric pressure. The fact that the foam has a closed cell structure allows the bead to maintain an internal pressure greater than atmospheric pressure after the impregnation step. When the beads are heated during molding, this internal pressure allows for further expansion of the foamed bead. Such pressurization of the foamed beads will typically be done with a gas such as air, $CO_2$, $N_2$, hydrocarbon, etc. Then, the beads are put into a mold to form a selected product.

In the extrusion foaming process, the temperature profile of the extruder must be carefully controlled to allow for melting and mixing of the solids, reaction with the chain extension agent (optional), mixing with blowing agent, (for example supercritical $CO_2$), and cooling of the melt mixture prior to extrusion through the die. The temperatures of the initial barrel sections allows for melting and mixing of the solids, including the dispersion of nucleating agent within the melt. At the same time, the optional chain extension agent reacts with the chain ends of the polymer, increasing branching and molecular weight, which increases viscosity of the melt and improves the melt strength of the plastic. Prior to injection of the blowing agent, a melt seal is created within the extruder by careful design of internal screw elements to prevent the flow of the blowing agent from exiting the feed throat. The melt seal maintains pressure within the extruder allowing the blowing agent to remain soluble within the melted plastic. After injection of the blowing agent, mixing elements are used to mix the blowing agent with the melt. Soluble blowing agent within the melt plasticizes the melt dramatically, greatly reducing its viscosity. The plasticization effect allows for the cooling of the melt to below the normal melting temperature of the compostable of biobased polymer in the final sections of the extruder. The cooling is necessary to increase the viscosity of the plasticized melt, allowing for retention of a closed cell structure during foaming at the die.

Nucleating agents serve as nucleation sites for blowing agent evolution during foaming. When depressurization occurs at the die, the blowing agent dissolved in the plastic melt comes out of solution into the gas phase. By entering the gas phase, the volume occupied by the blowing agent increases dramatically, producing a foamed structure. By dispersion of the nucleating agent in the melt, the blowing agent will evenly evolve from its soluble state within the melt to its gaseous form during depressurization, thus producing a fine cellular foam. Without properly dispersed nucleation sites, the foaming can be uneven, producing large voids or open cell structure where cell walls are fractured and interconnected. Large voids and open cell structure creates a harder, more brittle foam. Very low density foams with closed cell structure can be described as spongy, having a good elastic recovery after significant compression.

As extrudate exits the die and is foamed, rotating knives of the pelletizer cut the bead at the face of the die. When cut, the foam is not completely established. The foaming process continues to shape the structure of the bead after it has been cut. The blowing agent continues to evolve, expanding the particle. The outer skin of the particle remains rubbery while cut, allowing the surface of the foamed bead to flow and reform a smooth, solid surface.

The melt processable, compostable or biobased foam composition of the invention can be prepared by any of a variety of ways. For example, the compostable or biobased polymer, blowing agent, nucleating agent, and optional additives can be combined together by any of the blending means usually employed in the plastics industry, such as with a mixing extruder. The materials may, for example, be used in the 15 form of a powder, a pellet, or a granular product. The mixing operation is most conveniently carried out at a temperature above the melting point or softening point of the polymer. The resulting melt-blended mixture can be processed into foamed beads by cutting the extrudate mixture of polymer and blowing agent at the face of the extrusion die. By cutting the extrudate at the face of the extrusion die, a bead is formed before complete expansion of the foam has occurred. After pelletization, a foamed bead is formed from expansion of the extrudate by the blowing agent. The foamed bead cools by the release of blowing agent, but subsequent cooling can be applied by contacting with water, water vapor, air, carbon dioxide, or nitrogen gas. The resulting foamed beads can be molded into a three-dimensional part using conventional equipment utilized in molding expandable polystyrene. In one embodiment, the foamed beads contain residual blowing agent and can be post expanded in the molding process. In another embodiment, the foamed beads are pressurized with a gas, such as air or carbon dioxide, before molding to allow for expansion during molding.

Melt processing typically is performed at a temperature from about 80° to 300° C., although optimum operating temperatures are selected depending upon the melting point, melt viscosity, and thermal stability of the composition. Different types of melt processing equipment, such as extruders, may be used to process the melt processable compositions of this invention. Extruders suitable for use with the present invention are described, for example, by Rauwendaal, C., "Polymer Extrusion," Hansen Publishers, p. 11-33, 2001.

In one embodiment, the resulting compostable or biobased, foamed bead has a specific gravity less than 0.15 g/cm3. In another embodiment, the compostable or biobased, foamed bead has a specific gravity of preferably less than 0.075 g/cm3, and most preferably less than 0.05 g/cm3.

Preferably, the polymer for making the foamed bead is greater than 50% biobased content, most preferably greater than 80% biobased. In one embodiment, more than 50 wt % of the foam is compostable, as determined by ASTM D6400. In a preferred embodiment, more than 80% of the foam is compostable. In a most preferred embodiment, greater than 95% of the foam is compostable.

The first three examples below utilize a single type of PLA resin. It is known, however, that the degree of crystallinity in PLA is controlled by two general aspects, first composition, and second by process. The PLA polymer is composed of lactic acid monomers, but there are two types of lactic acid monomers. Although composed of the same elements, functional groups, and chemical bonds, the stereochemistry of the monomers is different. The two isomers of lactic acid, the so-called 1 and cl-isomers, have a different three-dimensional 'handedness.' The result is that the type of isomer can affect the position of the pendant methyl groups along the backbone of the PLA polymer chain. PLA chains that are 100% composed of either 1 or cl-isomers will be highly crystalline because the polymer chains can pack tightly against each other. By introducing small concentrations of the other isomer, the crystallinity begins to decrease because the position of the pendant methyl groups begins to disrupt the higher order structure of crystallinity. PLA with nearly 50/50 mixtures of 1 and cl-isomers results in a completely amorphous polymer. The 1-isomer of lactic acid is the predominant natural form of lactic acid, so most semi-crystalline PLAs are predominantly composed of 1-isomer with random impurities of the d-isomer. It is very difficult to produce PLAs from either 100% 1 or d-isomer, so all semi-crystalline materials available in bulk quantities will contain a small d-isomer content. The 805 ID resin has a d-isomer content of about 3.7 to 4.6%, whereas the 4032D resin has a d-isomer content less than 2% (between 1.2 and 1.6%).

A second aspect of thermal stability in PLA is the process and thermal history of the plastic. PLA is slow to crystallize. Although the d-isomer content may be within an appropriate range to support crystallinity, this does not necessarily happen if the material is cooled too quickly. All crystallinity is lost when the plastic is heated above its melting point, and a slow thermal annealing is required to induce crystallization. Fillers, such as high performance talcs are often used to promote a more rapid crystallization, yet most extrusion applications that are hoping to take advantage of high crystallinity for thermal stability will require an annealing step between 100° and 130° C., to sufficiently crystallize the PLA. However, in the extrusion foam application, there is sufficient shear and elongation during generation of the foam to induce crystallinity within the very thin films of plastic separating the closed cells of the foam. In addition, nucleating agents used to promote dispersion and nucleation of $CO_2$ dissolved into the melt during foam processing, also improve crystallization kinetics. Therefore, the extrusion foam process induces rapid crystallization of PLA. From the perspective of thermal stability, this is fortuitous because no annealing step is required.

FIG. 1 shows a process schematic for bead production by an extrusion foaming process.

The extruder used for the mixing process in the examples below was a Leistritz Z SE 27 MAXX co-rotating twin-screw extruder having ten stages in the barrel. The barrel of the extruder was equipped with an injection port to supply supercritical carbon dioxide ($CO_2$) into the plastic melt in the fourth barrel section. $CO_2$ in the supercritical state was produced by pressurizing liquid $CO_2$ from a pressurized cylinder with a TharSFC P-50 high-pressure pump to a pressure of 27.6 MPa (4000 psi). All pressurized tubing was jacketed for cooling with an ethylene glycol—water mixture at a set point of 2° C. (35° F.).

Compounding Procedure

Compostable or biobased polymer compositions were prepared using the following protocol.

EXAMPLE #1

A dry mix blend of plastics was produced consisting of approximately 97% by weight of NatureWorks Ingeo 8051D polylactic acid (PLA), approximately 2% by weight of Clariant CESA-extend OMAN698498 styrene-acrylic multifunctional oligomeric reactant, and approximately 1% by weight of Cereplast ECA-023 talc masterbatch. The dry mix of pellets was fed gravimetrically into the feed throat section of the twin-screw extruder. The feed rate for the solids was set to 3.5 kg/hr (7.7 lbs/hr), and the screws were rotating at 40 rpm. Supercritical carbon dioxide ($CO_2$) was injected into the plastic melt in the fourth barrel section at 10 g/min. A single strand die with a 3 mm opening was bolted to the end of the extruder.

Initially a flat temperature profile at 210° C. was used. Upon start up, the extrudate was hotter than 200° C.; however, at this high temperature, the extrudate was poorly foamed, exhibited low melt strength, and lacked the viscosity to hold onto the blowing agent. The cell structure collapsed quickly from rapidly escaping $CO_2$ leaving an open cell structure with only a minor density reduction. The temperature profile over the ten barrel sections from feed to exit was systematically adjusted to achieve 210° C., 199° C., 177° C., 155° C., 122° C., 111° C., 100° C., 102° C., 101° C., and 85° C. across the extruder. At these conditions, the melt pressure at the die was 11.7 MPa (1700 psi). The extrudate was foamed to a density less than 0.04 g/cm3 (2.5 lb/ft3) with a closed cell structure. The surface temperature of the strand extrudate was less than 40° C.

EXAMPLE #2

The process described in Example #1 was followed and improved to include a pelletizing operation at the die face. An off-axis, two-blade pelletizer was mounted to the extruder and die assembly. Foamed beads were cut at the face of the die with a pelletizer operating at 1500 rpm. The foamed beads were free flowing and did not stick together.

The surface of the foamed beads was complete and did not exhibit open or broken cells. The density of the foamed beads was less than 0.04 g/cm3 (2.5 lb/ft3), and the bead diameter was approximately 10 mm.

EXAMPLE #3

Figure 2:
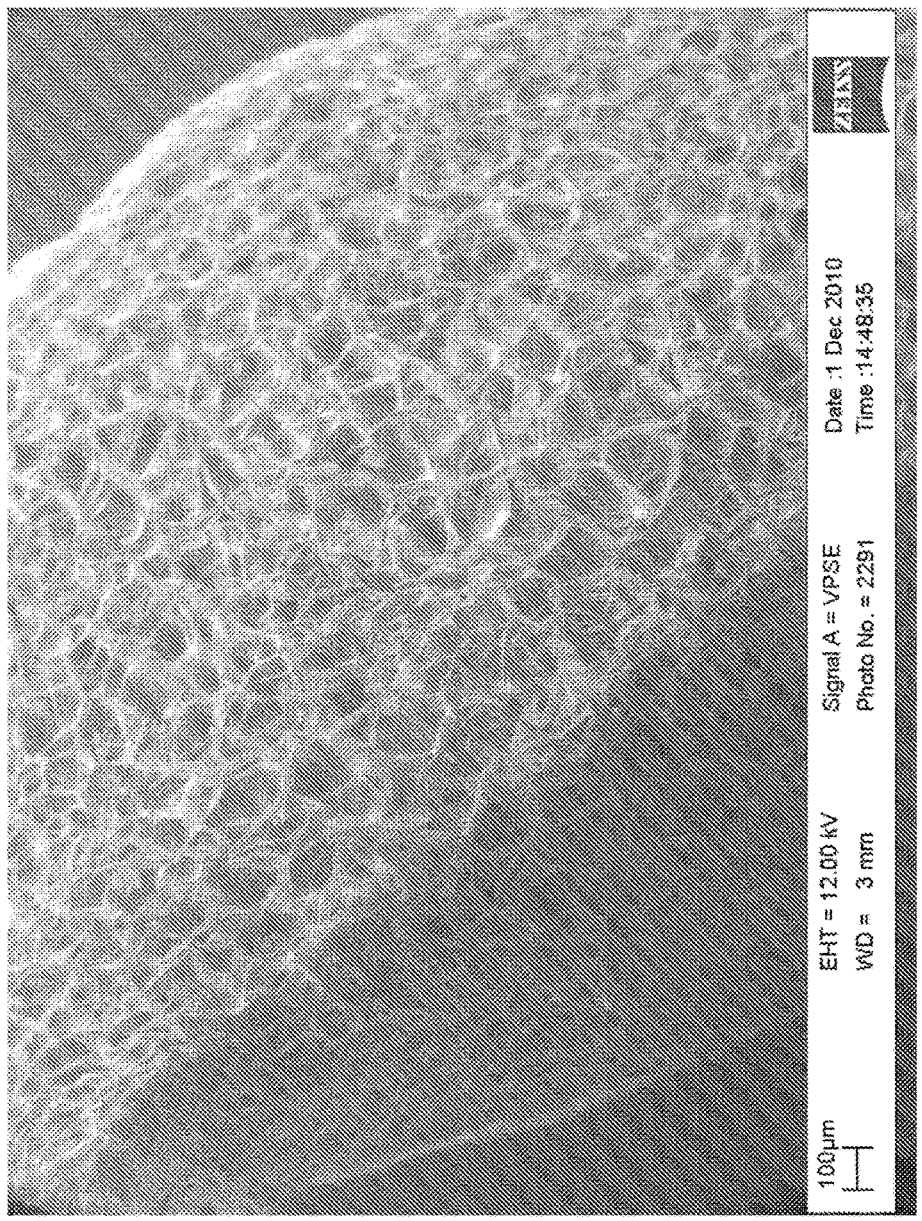
FIG. 2 shows a cross-section of a foamed bead produced by an exemplary process according to one embodiment of the present invention.

The process described in Example #1 was modified to replace the 3 mm single strand die, with an eight-hole die having 0.8 mm die openings. The new die included an adapter section that added one heating zone before the die. The pelletizing system was changed to an on-axis, two-blade cutting system, operating at 2500 rpm. The feed rate of the dry blend of resin, chain extender, and talc masterbatch was decreased to 2.3 kg/hr (5 lbs/hr). The final process temperature profile during production of low density foam was adjusted to 210° C., 199° C., 177° C., 155° C., 115° C., 115° C., 115° C., 115° C., 115° C., 130° C., and 135° C. across the extruder and die. The extruder screws operated at 25 rpm. The feed rate of supercritical CO2 was 7.0 g/min at a pressure of about 10.3 MPa (1500 psi). The melt pressure during operation of the extruder was about 15.8 MPa (2300 psi) behind the die. The foamed beads produced had a diameter in the range of 2 mm to 5 mm with a density less than 0.045 g/cm3 (2.8 lb/ft3). FIG. 2 displays a micrograph taken by scanning electro-microscopy of a wedge-shaped cross-section of a foamed bead, showing a closed cell structure with cell size in the range of 50 to 150 μm.

EXAMPLE #4

The process described in Example #3 was modified to produce foamed beads with a smaller bead diameter and from a different composition. The die was replaced with a twelve-hole die having 0.6 mm die openings. The feed composition was pre-compounded on a 38 mm SHJ-38 co-rotating twin-screw extruder from Lantai Plastics Machinery Company with a flat temperature profile of 180° C. For this operation, a dry blend mix was prepared from approximately 87% by weight NatureWorks Ingeo 8051D PLA, approximately 10% by weight of NatureWorks Ingeo 4032D PLA, approximately 2% by weight of Clariant CESA-extend OMAN698498 styrene-acrylic multifunctional oligomeric reactant, and approximately 1% by weight of Cereplast ECA-023 talc masterbatch. The compounded formulation was subsequently fed into the feed throat of the Leistritz Z SE 27 MAXX extruder at 2.3 kg/hr (5.0 lbs/hr) with a screw speed of 25 rpm. The feed rate of supercritical CO2 was 7 g/min, and the temperature profile followed 210° C., 199° C., 177° C., 155° C., 115° C., 115° C., 115° C., 115° C., 115° C., 150° C., and 150° C. The pelletizer operated at 1920 rpm, cutting the extrudate at the face of the extrusion die. The melt pressure behind the die was about 15.2 MPa (2200 psi). The foamed beads produced had a diameter in the range of 1 mm to 4 mm with a density less than 0.045 g/cm3 (2.8 lb/ft3). The foamed beads produced in this process were compared for relative heat stability to the foamed beads produced in Example #3. Placed side-by-side on a hot plate and heated with an increasing temperature ramp, the foamed beads softened at a higher temperature than the foamed beads from Example #3.

EXAMPLE #5

The foamed beads from Example #4 were pressurized in a sealed vessel at 0.45 MPa (65 psi) for less than 30 minutes. A rapid depressurization of the vessel was performed to remove the beads. The surface of the beads was taut from the internal pressure exceeding atmospheric pressure. The beads were vacuum fed into the cavity of a steam chest molding press (Hirsch HS 1400 D) within 1 minute of removal from the pressure vessel. The initial mold cavity temperature during fill was about 25° C. A conventional aluminum mold for expandable polystyrene (EPS) was used in the shape of a box. A four-step process was used for molding of a final product. The purge cycle was set for 1 second at 0.55 bar steam pressure and a 30% valve opening. The first cross steam process was set for 20 seconds at 0.55 bar steam pressure and a 90% valve opening. A second cross steam process, reversing the direction of steam flow, was used for 20 seconds at a steam pressure of 0.65 bar and a 90% valve opening. Cooling water was applied for 15 seconds on both sides of the mold, followed by 30 seconds of cooling air at 4 bar pressure. After cooling air, 5 seconds of vacuum was applied. The molded box was removed from the press. The shapes of the beads after molding clearly demonstrated secondary expansion of the foamed beads within the mold. Surface depressions and textures from the mold cavity were replicated into the surface of the article. Based on weight and geometry of the box, the density of the molded article was less than 0.03 g/cm3 (2.0 lb/ft3).

Figure 3:
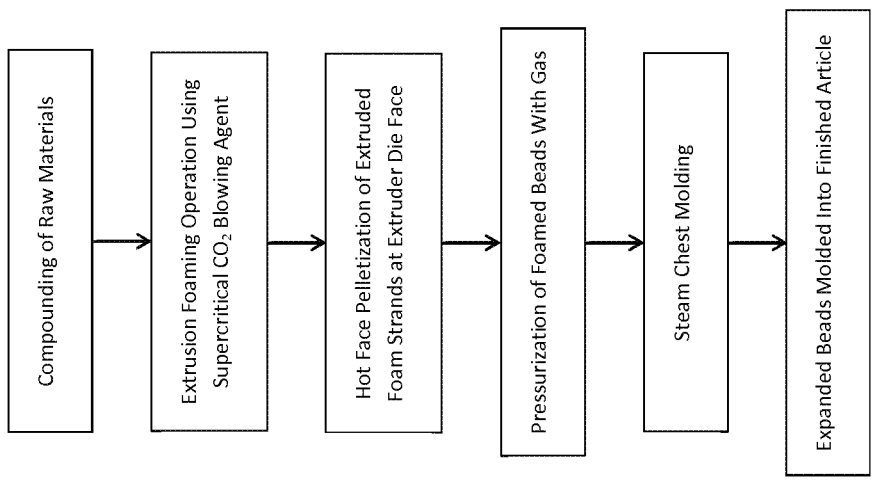
FIG. 3 shows a summary flow chart illustrating the process flow for producing foamed articles according to the present invention.

The invention described herein allows for the conversion of an existing EPS manufacturing plant to produce a foamed article based on a compostable or biobased polymer. FIG. 3 shows a summary of the steps for creating a finished article using the composition and process described in the above examples. First, the raw materials of PLA polymers, nucleating agent, and other additives are compounded. In some embodiments, such as described in Example #4, the raw materials may be compounded in a separate extruder. Next, a blowing agent, preferably supercritical CO2, is added to the admixture. Small, lightweight, foamed beads are produced by hot face pelletization of extruded foamed strands at the extruder die face. In some embodiments, the foamed beads may be cooled using a water bath or other appropriate method. The foamed beads are then pressurized to promote secondary expansion in the molder for the desired end product. Such pressurization of the foamed beads will typically be done with a gas such as air, CO2, N2, hydrocarbon, etc. Then, the beads are put into a mold to form a selected product. As described in Example #5, a steam press may be used for molding. The beads are expanded in the mold to create a finished product.

The invention has been described with references to specific embodiments. While particular values, relationships, materials and steps have been set forth for purposes of describing concepts of the invention, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present invention, various other embodiments as well as potential variations and modifications of the embodiments shown and described herein will obviously occur to those skilled in the art upon becoming familiar with such underlying concept. It is intended to include all such modifications, alternatives and other embodiments insofar as they come within the scope of the invention. It should be understood, therefore, that the invention might be practiced otherwise than as specifically set forth herein. Consequently, the present embodiments are to be considered in all respects as illustrative and not restrictive.

We claim:

1. A method of making compostable or biobased foam beads comprising:
   mixing a biobased polymer and a physical blowing agent that does not contain a volatile organic component in an extruder wherein the extruder has a temperature that is above a melting point of the biobased polymer and wherein a biobased polymer melt is formed;
   extruding the biobased polymer melt by forcing the melt through an extrusion die opening to form an extrudate wherein the temperature at an exit of the extrusion die is about 30-50° C. lower than the melting temperature of the biobased polymer melt wherein the blowing agent expands within the extrudate upon exiting the extrusion die opening; and
   cutting the extrudate at the face of the die to produce biobased foam beads.

2. The method of claim 1 further comprising cooling the extrudate after exiting the extruder by contacting the extrudate with a cooling agent selected from the group consisting of water, water vapor, air, carbon dioxide, and nitrogen gas.

3. The method of claim 1 further comprising supplying an additive to the mixture of the biobased polymer and the physical blowing agent.

4. The method of claim 3 wherein the additive comprises a compound selected from the group consisting of a chain extender, a plasticizer, an antioxidant, a light stabilizer, a fiber, a foaming additive, an antiblocking agent, a heat stabilizer, an impact modifier, a biocide, a compatibilizer, a tackifier, a colorant, a coupling agent, an antistatic agent, an electrically conductive filler, and a pigment.

5. The method of claim 1 wherein the biobased polymer comprises a polymer selected from the group consisting of polylactic acid, poly-L-lactic acid, poly-D-lactic acid, random copolymer of L-lactic acid and D-lactic acid, stereo-regular copolymer of L-lactic acid and D-lactic acid, derivatives thereof, polycaprolactone, polyhydroxybutyric acid, polyhydroxyvaleric acid, polyethylene succinate, polybutylene succinate, polybutylene adipate, polymalic acid, polyglycolic acid, polysuccinate, polyoxalate, polybutylene diglycolate, and polydioxanone.

6. The method of claim 1 wherein the biobased polymer comprises polylactic acid.

7. The method of claim 1 wherein the physical blowing agent comprises a compound selected from the group consisting of water, carbon dioxide, sodium carbonate, calcium carbonate, potassium carbonate, magnesium carbonate, azodicarbonamide, nitrogen, and mixtures thereof.

8. The method of claim 1 wherein the blowing agent comprises about 0.05 to about 90 wt % of the final composition.

9. The method of claim 1 wherein the blowing agent includes a carrier.

10. The method of claim 4 wherein the additive comprises a chain extender and the chain extender comprises a multi-functional reactive polymer.

11. The method of claim 1 further comprising supplying a nucleating agent selected from the group consisting of talc, kaolin, mica, silica, calcium carbonate, barium sulfate, titanium oxide, aluminum oxide, clay bentonite, diatomaceous earth, and azodicarbonamide to the mixture of the biobased polymer and the physical blowing agent.

12. The method of claim 1 wherein the physical blowing agent comprises supercritical carbon dioxide.

13. The method of claim 1 further comprising molding the biobased foam beads into a three-dimensional shaped product by post-expanding the biobased foam bead.

14. The method of claim 1 further comprising pressurizing the biobased foam beads by pressurization of the biobased foam beads with a gas before molding to allow for expansion during molding.

15. The method of claim 1, wherein the biobased polymer has a molecular weight of up to about 1000 daltons.

16. The method of claim 1, wherein the biobased polymer has a melting point of no more than about 150° C.

17. The method of claim 1, wherein the temperature profile from a feed to an exit of the extruder extends from about 210° C. at the feed to about 85° C. at the exit.

18. The method of claim 1, wherein the temperature profile from a feed to an exit of the extruder extends from about 210° C. at the feed to about 135° C. at the exit.

19. The method of claim 1, wherein the temperature profile from a feed to an exit of the extruder extends from about 210° C. at the feed to about 150° C. at the exit.

* * * * *